Nov. 19, 1935.  A. ENGLAND  2,021,841
HOSE COUPLING GAUGE
Filed June 27, 1933
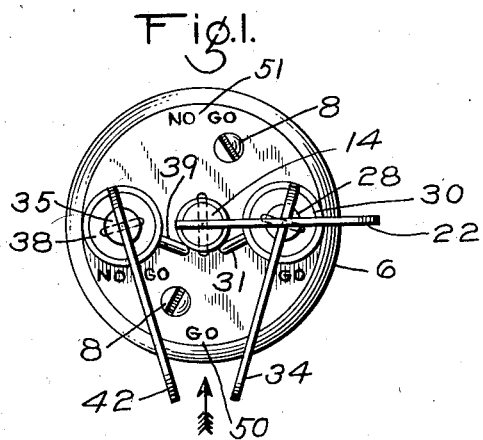
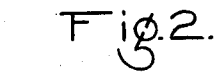
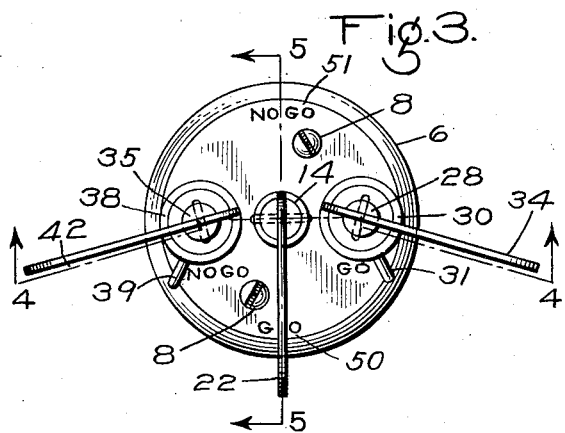
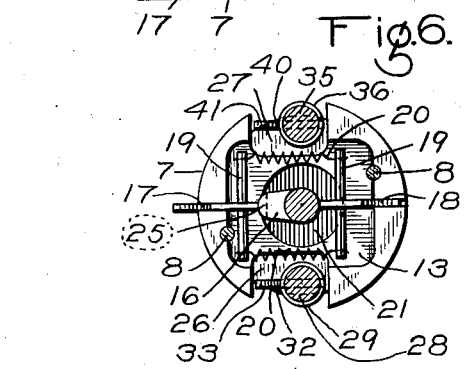
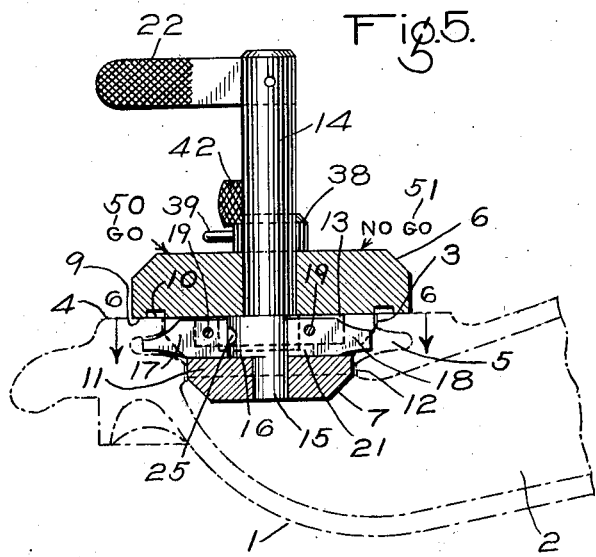
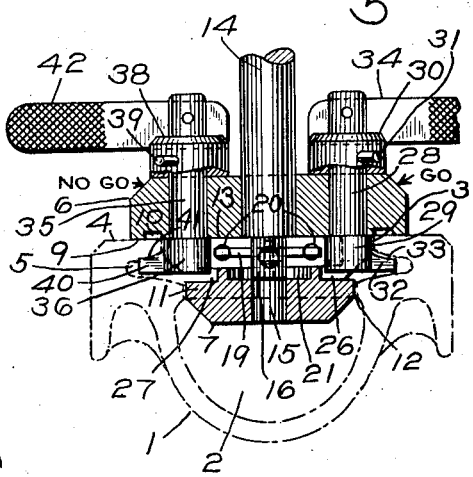
INVENTOR
ALEXANDER ENGLAND
BY Wm. M. Cady
ATTORNEY Patented Nov. 19, 1935

2,021,841

UNITED STATES PATENT OFFICE 2,021,841

HOSE COUPLING GAUGE

Alexander England, Wilkinsburg, Pa., assignor to The Westinghouse Air Brake Company, Wilmerding, Pa., a corporation of Pennsylvania Application June 27, 1933, Serial No. 677,806

6 Claims. (Cl. 33—174)

This invention relates to test gauges and more particularly to a test gauge for hand operated hose couplings.

The railway type of hand operated hose coupling is usually provided on one side with a flat, machined face and opening to said face is a bore provided to permit the flow of fluid under pressure. Opening into this bore a certain distance from the flat face of the coupling, is an annular, wedge-shaped groove. A gasket ring having a cylindrical portion extending into the bore in the coupling is provided with an outwardly projecting, annular, wedge-shaped flange disposed in the groove in the coupling for effecting a seal in the groove, the cylindrical portion of the gasket extending beyond the flat face of the coupling and being adapted to engage and effect a leak-proof seal with the corresponding cylindrical portion of a counterpart gasket, when two couplings are connected.

In the coupling, it is essential that the width of the annular groove, where engaged by the flange of the gasket, be within predetermined limits, and that the distance from the flat, machined face of the coupling to the groove also be within predetermined limits in order to prevent leakage past the gasket and to permit the gasket to function as intended.

The principal object of my invention is to provide a test gauge for hose couplings to determine whether the width of the gasket groove where engaged by the gasket is within predetermined limits, and whether the location of the groove with respect to the flat gasket face of the coupling is within predetermined limits.

In the accompanying drawing; Fig. 1 is a plan view of my improved hose coupling gauge; Fig. 2 is a side elevation looking in the direction of the arrow in Fig. 1; Fig. 3 is a plan view similar to Fig. 1 but with the gauge operating handles disposed in a gauging position; Fig. 4 is a sectional view on the line 4—4 of Fig. 3 and showing the gauge applied to a hose coupling which is shown in dot and dash lines; Fig. 5 is a sectional view on the line 5—5 of Fig. 3 and showing the gauge applied to a hose coupling; and Fig. 6 is a sectional view taken on the line 6—6 of Fig. 5.

Fig. 4 shows a transverse section of a hand operated hose coupling, while Fig. 5 shows a partial longitudinal section of the hose coupling, the hose coupling being of the well known type comprising a body 1 having a fluid pressure conduit 2 communicating with a bore 3 leading to a flat, machined face 4 on one side of the body. A wedge-shaped groove 5, concentric with the bore 3, is provided in the coupling a predetermined distance below the flat face 4, said groove being adapted to receive the wedge-shaped flange of the usual ring gasket (not shown) while the cylindrical portion of said gasket is adapted to extend through the bore 3 and slightly beyond the face 4 of the coupling for engaging a corresponding gasket in a counterpart coupling (not shown).

The hose coupling gauge comprises a ring-shaped body 6 and a concentric metal boss 7 secured to one side of the body by means of two screws 8. On the side of body 6 carrying the boss 7, the body is provided with a gauging surface 9 which is adapted to engage the flat face 4 of the coupling 1, as shown in Figs. 4 and 5, an annular groove 10 being provided in the gauging surface 9 to reduce the width of the gauging surface 9 and thereby better ensure proper contact between said surface and the face 4 of the coupling. The boss 7 is of such diameter adjacent body 6 as to provide a free sliding fit in bore 3 in the coupling and is provided with a portion 11 of reduced diameter which freely enters the opening 12 adjacent the inner edge of the gasket groove 5, the outer end of said boss being tapered to facilitate the application of the gauge to a coupling.

As shown in Fig. 6, the boss 7 is provided interiorly with an axial bore 21 open at one end to a cavity 13. A shaft 14 is journaled in the body 6 and is provided with an extension 15 of reduced diameter extending through cavity 13 and axially of bore 21 and into a suitable bore in boss 7. A cam or eccentric 16 is provided on the shaft extension 15 in bore 21 and extends into the cavity 13.

The boss 7 is provided with two diametrically opposite slots opening into the bore 21 and cavity 13 at opposite sides of the cam 16 and slidably mounted in said slots are two bayonet-like gauge blades 17 and 18. A pin 19 is provided which extends through the inner end of each of said blades in cavity 13. A spring 20 connects the ends of the pins 19 at one side of the shaft extension 15 while a corresponding spring 20 connects the opposite ends of the pins 19 at the opposite side of said shaft extension, said springs acting to hold the inner ends of the gauge blades 17 and 18 in engagement with cam 16 at all times. The cam 16 is provided at its extremity with a slot 25 to permit the extremity of the cam to clear said springs, when the cam is turned from one gauging position to another, as will be hereinafter described.

The length of the gauge blades 17 and 18 is such that when fully projected out of boss 7 by the action of cam 16, they will gauge the width of that portion of gasket groove 5 which is adapted to be engaged by the usual ring gasket (not shown). Adjacent the outer end of gauge blades 17 and 18, the top and bottom edges of the blades are cut away to provide a contour substantially the same as the standard contour of the gasket groove 5, but the width of the gauge blade 17 at the outer end is less than that of blade 18. The outer end of the gauge blade 17 constitutes a "GO" gauge and a gasket groove which will permit full entry of this gauge blade by the action of cam 16 is sufficiently large to ensure proper functioning of a gasket. The end of gauge blade 18 constitutes a "NOGO" gauge and if a gasket groove permits full entry of this gauge blade, the groove is too large to ensure sealing of a gasket therein.

An operating handle 22 is secured to the outer end of shaft 14 for turning said shaft and thereby cam 16. The body 6 is stencilled with the legends "GO" and "NOGO", as indicated by reference numerals 50 and 51, respectively, for designating the two gauging positions of handle 22. In the "GO" position of handle 22, the gauge blade 17 is adapted to be fully projected by cam 16 while the gauge blade 18 is adapted to be fully retrieved by springs 20, as shown in Figs. 3, 5 and 6. When the handle is turned to the "NOGO" position, the gauge blade 18 is adapted to be fully projected by cam 16 and the gauge blade 17 fully retrieved by the springs 20.

At right angles to the slots in the boss 7 containing blades 17 and 18, said boss is cut out to form two oppositely disposed cavities 26 and 27. A shaft 28, having an enlarged head portion 29 disposed in cavity 26, is mounted to rotate in a suitable bore in the body 6. A sleeve 30 is secured to said shaft by means of a pin 31, and is adapted to hold the head portion 29 of said shaft in engagement with the body. A gauge blade 32 is secured in the head portion 29 of the shaft, and is of such length that when turned to a radial position, said gauge blade will extend into the groove 5 of a hose coupling substantially the same distance as a gasket extends into said groove. The edge 33 of the gauge blade 32 is provided with a contour substantially the same as that of the outer wall of the gasket groove 5, and is arranged a predetermined distance from the surface 9 on the body 6, said edge constituting a "GO" gauge for the distance from the face 4 on the body to said groove. The width of the blade 32 is less than the width of the groove 5 in the coupling so that the edge of said blade opposite the gauging edge 33 will not engage the coupling within the groove 5, when the gauge is being used as will be hereinafter described. A handle 34 is secured to the outer end of shaft 28 for turning the "GO" gauge blade 32 from the position in the boss 7, as shown in Fig. 6, to the gauging position shown in Fig. 4.

A shaft 35 is rotatably arranged in a suitable bore in body 6 diametrically opposite to shaft 28 and is provided with a head portion 36 in cavity 27, a sleeve 38 being secured to shaft 35 outside of the body 6 by means of a pin 39 for holding the head portion 36 in engagement with the body. A gauge blade 40 is carried in the head portion 36 and is of the same length as the gauge blade 33. The gauge blade 40 is provided with a gauging edge 41 like that of blade 33, but the gauging edge 41, which constitutes a "NOGO" gauge, is closer to the gauging surface 9 on the body 6 than is the gauging edge 33 on blade 32. The width of the "NOGO" gauging blade 40 is less than that of groove 5 so that the lower edge of the blade will not engage the coupling within the groove when the gauge is being used, as will be hereinafter described. A handle 42 is secured to the outer end of shaft 35 for turning the "NOGO" gauge blade 40 from the position in the boss 7, as shown in Fig. 6, to the gauging position as shown, in Fig. 4.

To use the gauge, the handles 22, 42 and 34 are turned to the position shown in Fig. 1. In this position of handle 22, the cam 16 is at right angles to the position shown in Fig. 6, which permits springs 20 to hold the gauge blades 17 and 18 entirely within the slots in boss 7. With the handles 42 and 34 in the position shown in Fig. 1, which position may be defined by the engagement of pins 39 and 31 with shaft 14, the gauge blades 32 and 40 are within the cavities 26 and 27 of boss 7, as shown in Fig. 6. The gauge is now applied to the hose coupling 1, the boss 7 entering the bore 3 in the coupling until the gauging surface 9 on the gauge body 6 engages the surface 4 on the coupling.

With the gauge thus applied to the coupling 1, the handle 22 may be turned from the position shown in Fig. 1 towards the "GO" position 50 as shown in Fig. 3, which projects the "GO" gauge blade 17 into the gasket groove 5 of the coupling. If the handle 22 can be moved fully to the legend "GO", it indicates that the gauge blade 17 has entered the groove 5 and therefore the groove is sufficiently large to meet requirements, but if the handle 22 cannot be moved fully to the legend "GO" it indicates that the gauge blade 17 cannot enter the groove 5 and therefore said groove is too small to meet requirements. If the coupling is not condemned as unsatisfactory by the inability of the "GO" gauge blade 17 to enter the groove 5, then the handle 22 is turned towards the "NOGO" position 51, this movement of handle 22 projecting the "NOGO" gauge blade 18 into the groove 5. If the gauge blade 18 enters groove 5 which permits handle 22 to be fully turned to the "NOGO" position 51, it indicates that the groove is too wide and therefore unsatisfactory, but if the gauge blade 18 engages the coupling within the groove 5 and prevents turning handle 22 to the "NOGO" position it indicates that the groove 5 is sufficiently small to meet requirements. It will now be seen that gauge blade 18 measures the maximum permissible width of groove 5 while gauge blade 17 measures the minimum permissible width of said groove and if the width of said groove comes within these gauging limits it is satisfactory for use.

In order to determine whether or not the gasket groove 5 is properly located with respect to the coupling face 4, the handle 34 is turned towards the gauging position indicated in Figs. 3 and 4, and this operation of said handle turns the "GO" gauge blade 32 into the coupling groove 5. If the edge 33 of the gauge blade 32 does not engage the upper wall of the gasket groove 5 it indicates that said groove is not too far away from the coupling face 4 to be satisfactory. Then handle 42 is turned towards the gauging position shown in Figs. 3 and 4 and if the edge 41 of the "NOGO" gauge blade 40 engages the upper wall of the gasket 5 it indicates that the groove 5 is not too close to the coupling face 4 to be satisfactory.

It will now be evident that by means of the hose coupling gauge the condition and location of the gasket groove 5 in a hose coupling with respect to the coupling face 4 can be accurately and quickly checked to determine whether or not a gasket in said groove will effect a proper seal in the groove and will cooperate with the abutting gasket of a counterpart coupling in the proper manner to prevent leakage.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A gauge for checking the width of the gasket groove which opens into the fluid conducting bore of a hose coupling comprising a body member adapted to engage a flat face of the coupling, a single movable gauge member associated with said body member and movable into said groove for checking the width of the groove, and a handle carried by said body member for moving said gauge member into said groove.

2. A gauge for checking the width of the gasket groove which opens into the fluid conducting bore of a hose coupling comprising a member adapted to engage a flat face of the coupling, a bayonet-like gauge associated with said member and movable into said groove for checking the minimum width of said groove, another bayonet-like gauge associated with said member and movable into said groove for checking the maximum width of said groove, and manually operated means carried by said member for moving said gauges into said groove.

3. A gauge for checking the width of the gasket groove which opens into the fluid conducting bore of a hose coupling comprising a member adapted to engage a flat face of the coupling, a boss on one side of said member adapted to fit into the fluid conducting bore of said coupling, a gauge carried within said boss and movable outwardly thereof into said groove for checking the minimum width of said groove, another gauge carried within said boss and movable outwardly thereof into said groove for checking the maximum width of said groove, manually operated means for moving said gauges into said groove, and resilient means for moving said gauges out of said groove and into said boss.

4. A gauge for checking the width of the gasket groove which opens into the fluid conducting bore of a hose coupling comprising a member adapted to engage a flat face of the coupling, a boss on one side of said member adapted to fit into the fluid conducting bore of said coupling and having an axial bore and two slots connected to said bore and leading to the exterior of said boss, a gauge member slidably mounted in one of said slots and movable outwardly thereof into said groove for checking the minimum width of said groove, a gauge member slidably mounted in the other of said slots and movable outwardly thereof into said groove for checking the maximum width of said groove, a cam in said bore interposed between the adjacent ends of said gauge members for moving said gauge members outwardly for checking said groove, spring means for moving said gauge members out of said groove and into said slots, and a handle for turning said cam.

5. A gauge for checking the width of the gasket groove which opens into the fluid conducting bore of a hose coupling comprising a body member adapted to engage a flat face of the coupling, a plurality of gauge members associated with said body member and movable into said groove and adapted to check, independently of each other, the width of said groove and a handle for moving said gauge members into gauging relation with said groove.

6. A gauge for checking the width of the gasket groove which opens into the fluid conducting bore of a hose coupling comprising a member having a free sliding fit in said bore, a bayonet-like gauge associated with said member and having a width equal to the minimum desired width of said groove and movable into said groove for checking the minimum width of said groove, another bayonet-like gauge associated with said member and having a width greater than the maximum desired width of said groove and movable toward said groove for checking the maximum width of said groove, and manually operated means carried by said member for moving said gauges into said groove.

ALEXANDER ENGLAND.